United States Patent [19]

Ander

[11] Patent Number: 5,537,695
[45] Date of Patent: Jul. 23, 1996

[54] MUSICAL TOILET TRAINING DEVICE

[76] Inventor: Anthony T. Ander, 40805 Newport Dr., Plymouth, Mich. 48170

[21] Appl. No.: 379,879

[22] Filed: Jan. 27, 1995

[51] Int. Cl.⁶ ............................................... A47K 11/04
[52] U.S. Cl. .................... 4/483; 4/902; 200/511
[58] Field of Search ................. 4/449, 479, 483, 4/661, 902; 116/67 R; 434/237; 200/511

[56] References Cited

U.S. PATENT DOCUMENTS

| | | | |
|---|---|---|---|
| 1,286,516 | 12/1918 | Bowron | 4/479 |
| 1,727,842 | 9/1929 | Stallworth | 219/436 |
| 2,075,308 | 3/1937 | Simonsen | 4/239 |
| 2,361,677 | 10/1944 | Bramhall | 4/239 |
| 2,535,704 | 12/1950 | Snyder et al. | 116/67 R |
| 2,663,861 | 12/1953 | Heath | 4/449 |
| 2,667,802 | 2/1954 | Harris | 84/95.2 |
| 2,699,139 | 1/1955 | Mackey | 116/67 R |
| 2,721,531 | 10/1955 | Findley | 116/67 R |
| 2,766,716 | 10/1956 | Mackey | 116/67 R |
| 2,788,764 | 4/1957 | Headlee | 116/67 R |
| 2,802,444 | 8/1957 | Gilmour | 116/67 R |
| 2,896,567 | 7/1959 | Gilmour | 116/67 R |
| 3,020,528 | 2/1962 | Swanson et al. | 4/483 |
| 3,059,608 | 10/1962 | Lee | 116/67 R |
| 3,172,390 | 3/1965 | Garthofner | 116/67 R |
| 3,268,916 | 8/1966 | Hix | 4/483 |
| 3,364,478 | 1/1968 | Waard | 4/483 |
| 3,416,163 | 12/1968 | Jordan | 4/483 |
| 3,428,967 | 2/1969 | Hughes | 4/484 |
| 3,530,855 | 9/1970 | Balding | 128/886 |
| 3,592,195 | 7/1972 | Van Wagenen | 604/54 |
| 3,657,745 | 4/1972 | Hickman | 4/483 |
| 3,680,151 | 8/1972 | Boardman et al. | 4/476 |
| 3,691,980 | 9/1972 | Shastal | 116/67 R |
| 3,715,549 | 2/1973 | Kraff | 200/330 |
| 3,979,570 | 9/1976 | Hyodo | 200/511 |
| 4,050,756 | 9/1977 | Moore | 200/511 X |
| 4,069,522 | 1/1978 | Messmer et al. | 4/483 |

(List continued on next page.)

FOREIGN PATENT DOCUMENTS

| | | | |
|---|---|---|---|
| 0408193 | 9/1969 | Australia | 4/902 |
| 2359936 | 6/1974 | Germany | 4/902 |
| 3640897 | 6/1988 | Germany | 4/902 |

OTHER PUBLICATIONS

Foxx and Azrin, "Dry Pants: A Rapid Method of Toilet Training Children", *Behav. Res. & Therapy*, vol. 11, pp. 435–442, Pergamon Press (1973).

Zerbey, "Modern Toilet Training", *Parent's Health Advisor*, Whittle Communications (1990).

"Toilet Training: A Parent's Guide", *American Academy of Pediatrics* (1989).

Brown and Brown, "The Increase and Control of Verbal Signals in the Bladder Training of a Seventeen Month Old Child—A Case Study", *Journal of Child Psychology and Allied Diciplines*, vol. 15, pp. 105–109, Pergamon Press (1974).

"Moochie de Poochie" and Honey le Bear, description (No. 261), *Baby Talk Magazine*, mail order section (Jan. 1994).

"Moochie de Poochie" and Honey le Bear, Brochure, Mid–Tennessee Mfg. Co., Inc. (1993).

"Moochie de Poochie" and Honey le Bear, advertisement, undated.

"Baby Music Potty" brochure, reciting U.K. Patent No. 2029776, R.O.C. Patent No. 32036, 35430, China Patent No. ZL 92 3 06425.7, U.S.A. Patent Pending (undated).

*Primary Examiner*—Robert M. Fetsuga
*Attorney, Agent, or Firm*—Banner & Allegretti, Ltd.

[57] ABSTRACT

A device for assisting in the toilet training. The device includes a bowl for receiving human waste as well as an electrical assembly. The electrical assembly includes two pins extending through the bowl, an elastomeric buffer, two contacts interconnected to a resistance sensor, and a melody generator. The buffer provides a solderless electrical connection between the corresponding pins and contacts. When the electrical resistance between the pins decreases, the resistance sensor detects the decrease in resistance between the two pins and contacts and delivers an activation signal to the melody generator.

1 Claim, 4 Drawing Sheets

U.S. PATENT DOCUMENTS

| | | | |
|---|---|---|---|
| 4,106,001 | 8/1978 | Mahoney | 340/604 |
| 4,162,490 | 7/1979 | Fu et al. | 340/603 |
| 4,174,544 | 11/1979 | Furusawa | 434/247 |
| 4,193,142 | 3/1980 | Henningfield | 4/483 |
| 4,205,404 | 6/1980 | Levins | 4/254 |
| 4,228,551 | 10/1980 | Chiung-Feng | 4/484 |
| 4,509,215 | 4/1985 | Paz | 4/452 |
| 4,539,559 | 9/1985 | Kelly et al. | 340/573 |
| 4,667,350 | 5/1987 | Ikenaga et al. | 4/304 |
| 4,692,752 | 9/1987 | Abel | 340/604 |
| 4,744,113 | 5/1988 | Kogut | 4/661 |
| 4,777,680 | 10/1988 | Paz | 4/484 |
| 4,883,739 | 11/1989 | Sakaguchi et al. | 430/192 |
| 4,883,749 | 11/1989 | Roberts et al. | 434/247 |
| 5,008,964 | 4/1991 | Dean et al. | 4/661 |
| 5,293,017 | 3/1994 | Bartlett | 200/511 |

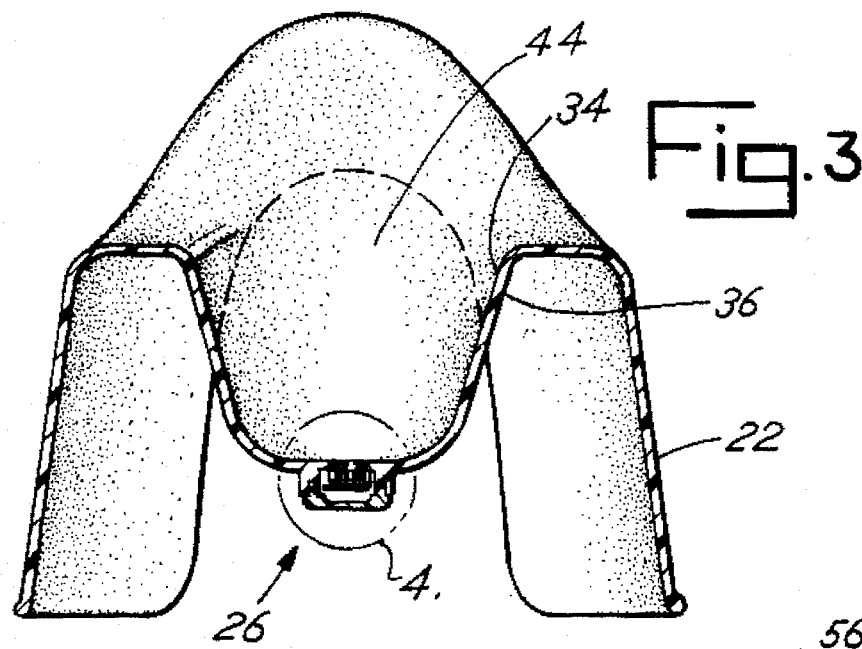
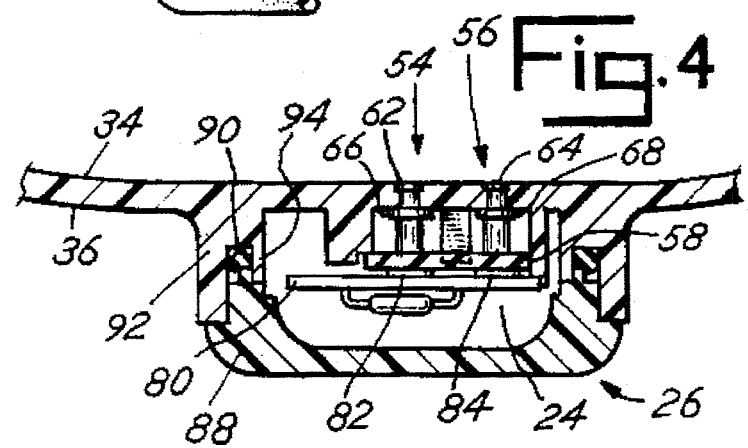
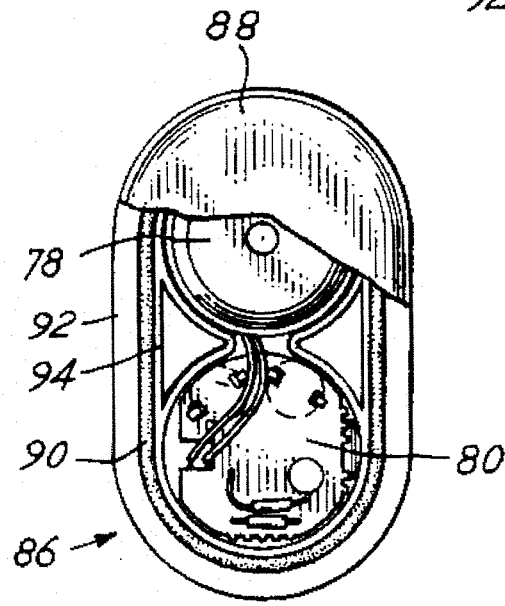
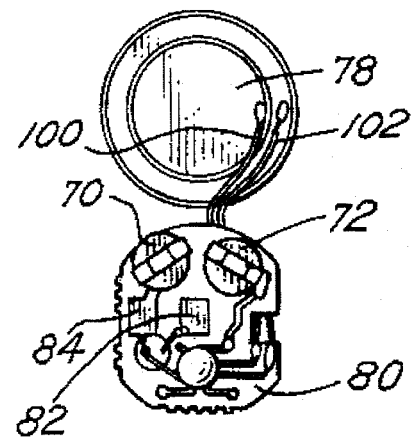

MUSICAL TOILET TRAINING DEVICE

BACKGROUND OF THE INVENTION

This invention relates generally to toilet training devices. More particularly, the invention relates to a toilet training device that plays a musical melody when it receives excrement and that is easier for manufacturers to assemble.

The failure to toilet train a child of a suitable age can be emotionally trying for both the child and parent (or other care-provider). A child who is old enough to control her or his bladder and bowl movements, but has not come to understand toilet training, may unnecessarily suffer not only problems associated with poor hygiene, such as skin irritation, but also substantial inconvenience and often embarrassment. Also, in such a case, the parent must contend longer with the inconvenience of diapers.

Children (or even pets) do not intuitively know that using a toilet (or other proper receptacle) to relieve both solid or liquid waste (hereafter "excrement") is a preferred behavior. In order to teach and motivate children of a suitable age to use the toilet, it is useful to help them to understand that use of the toilet is a proper behavior, even though the children may not yet be able comprehend oral instructions. At least one scholarly study has shown that, with proper training, the time for teaching a child of a suitable age (e.g., 20 months or older) to use a toilet can be significantly reduced. See, for example, the Journal of Child Psychology and Psychiatry, Volume 15, 1974, pages 105–109. Unfortunately, many presently available devices to help train children to use a toilet are bulky, expensive, unreliable, or too expensive.

SUMMARY OF THE INVENTION

The present invention includes a container for receiving the excrement. The container, or bowl, has an inner and outer surfaces. At least two electrical pins extend between the two surfaces. Two sensing contacts correspond to the two pins. An elastomeric buffer electrically couples the corresponding pins and contacts. A sensor detects the resistance between the two pins. When excrement is between the two pins, the resistance is reduced and the sensor responsively provides an activation signal. A music generator provides a variety of melodies in response to the activation signal.

Thus, an object of the present invention is an improved musical toilet training device. Another object is a toilet training device that is easier and less expensive to manufacture. These and other objects, features, and advantages of the present invention are discussed or are apparent in the following detailed description.

BRIEF DESCRIPTION OF THE DRAWING

Preferred embodiments of the present invention is described herein with reference to the drawing wherein:

FIG. 3 is a cross-sectional view of the embodiment shown in FIG. 2, taken along line 3—3;

FIG. 4 is a partial, expanded view of the bowl center and electric assembly shown in FIG. 3;

FIG. 5 is a bottom, partial view of the electronic module shown in FIG. 3;

FIG. 6 is a top, partial view of the electronic module shown in FIG. 5;

DETAILED DESCRIPTION OF THE PREFERRED EMBODIMENT

Figure 1:
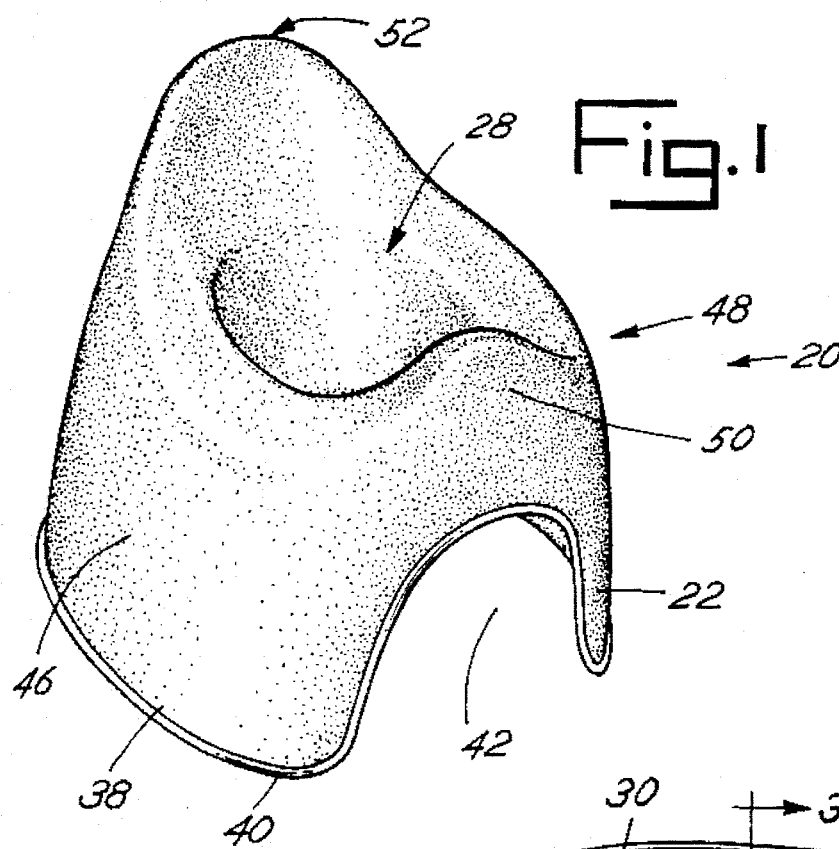
FIG. 1 is an isometric view of a preferred embodiment of the present invention.
Figure 2:
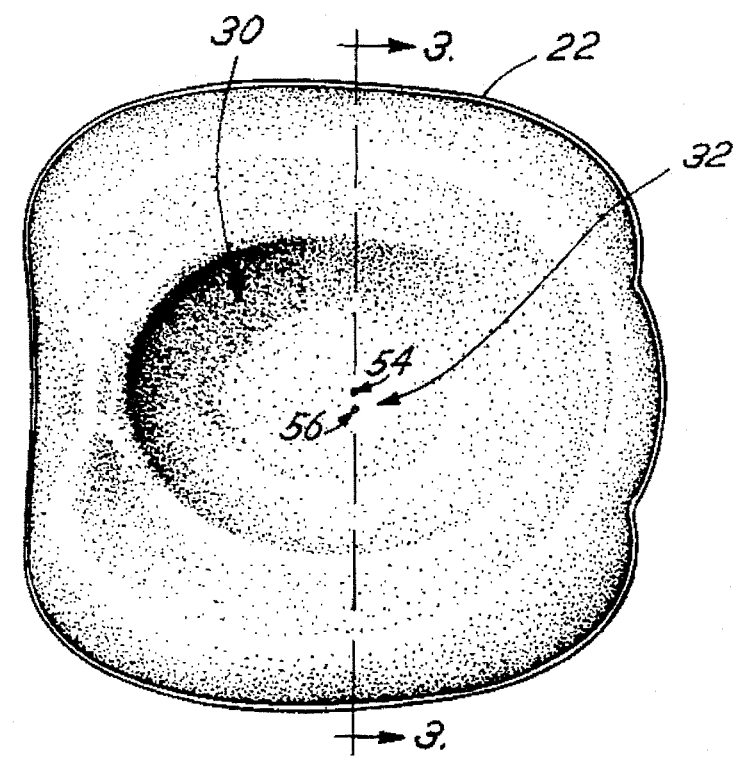
FIG. 2 is a top plan view of the embodiment shown in FIG. 1.

Referring to FIGS. 1–11, the preferred embodiment of the present invention is shown as a toilet training device 20. The device 20 comprises a hard, plastic shell 22, as well as an electric assembly 24. The electric assembly 24 is substantially within a housing 26.

The shell 22 is comprised of a non-porous plastic which defines a container or bowl 28 over which, for example, a child (not shown) may be seated. The shell 22 of the particular preferred embodiment shown is injection molded and ergonomically fashioned for a child's body.

The bowl 28 defines a wall 30 that slopes toward the bottom, center 32 of the bowl 28. Thus, the wall 30 directs excrement toward the center 32 of the bowl 28. As shown in FIGS. 1–4, the shell 22 defines inner and outer surfaces 34, 36.

As shown, the shell 22 accommodates infants weighing between, for example, 15 and 40 pounds. The base 38 of the shell 22 provides for stability when on the floor or ground. Reinforced edges 40 provide for added structural integrity. Front and rear cut outs 42, 44 provide a convenient place to hold the device 20 when carrying or cleaning it.

The inner surface 34 of the shell 22 is smooth. Since the shell 22 is substantially unitary and, thus, seamless, cleaning of the device 20 is easier, since excrement is not caught by or between seams. The light-weight plastic construction provides for easy portability. The shell 22 has substantially no sharp edges; the rounded corners provide for comfortable body and leg support. See FIGS. 1–3. The shell 22 defines two sides 46, 48, a front 50, and a rear 52. The sides 46, 48 extend approximately six inches above the bottom of the base 38. Infants with small and large legs can comfortably sit and touch the ground with their feet for an added feeling of stability and security. The front 50 is a urine deflector. The back 52 has a wrap-around contour to provide back support as well as additional comfort and security to the sitting infant.

Figure 9:
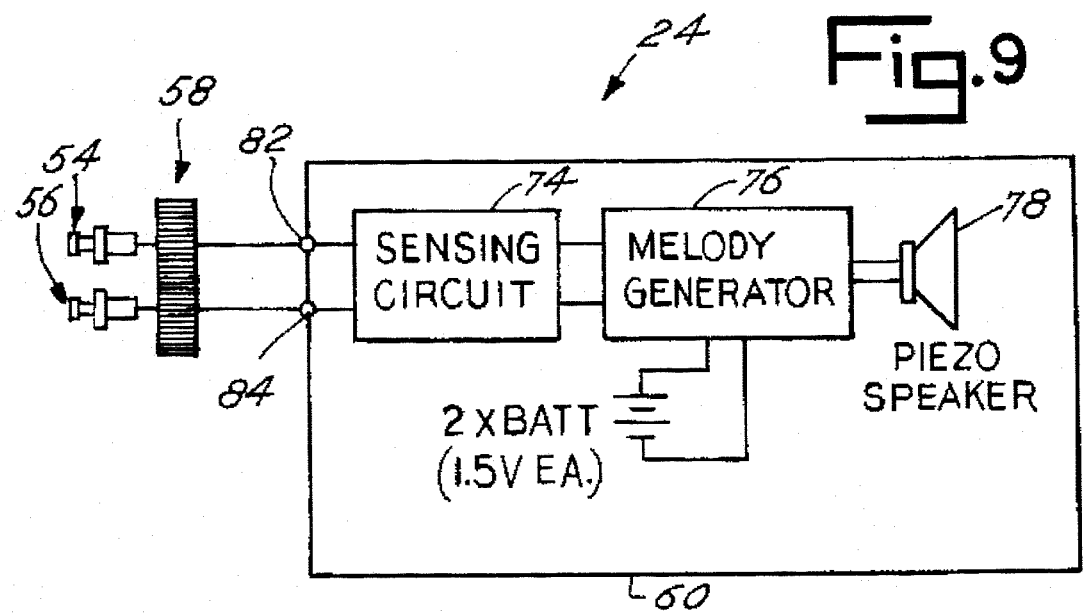
FIG. 9 is a block diagram of an electric assembly shown in FIG. 4.

As shown in FIG. 9, the electric assembly 24 includes first and second electrical pins 54, 56, an elastomeric buffer 58, and an electronic module 60. When excrement creates a lower resistance path between the pins 54, 56, the electronic module 60 senses the drop in resistance, through the buffer 58, and generates music.

The pins 54, 56 extend between the inner and outer surfaces 34, 36 of the shell 22 and lie at or near the bottom, or center 32, of the bowl 28. The pins 54, 56 are embedded into the shell 22 of the device 20 during the molding process. The pins 54, 56 of course, need not be of the shape shown.

The pins 54, 56 in the preferred embodiment are gold plated, in order to better resist their corrosive environment.

While such plating is not essential, the use of stainless steel or other corrosive-resistant or plated contacts may be effective to help prevent the contact from corroding if the contacts are made of metal. Of course, conductive, nonmetal contacts may also be used.

The shell 22 is approximately 0.1 inch thick. The pins 54, 56 each have top shoulders 62, 64 and bottom shoulders 66, 68, as shown in FIG. 4. The top shoulder of each pin 54, 56 is substantially flush with the inner surface 34 of the bowl 28 (for easy cleaning), and the bottom shoulders 66, 68 are flush with the outer surface of the shell 22.

The exposed surface area of the pins 54, 56, the distance between the pins 54, 56, and the moisture in the bowl 28 all affect the total resistance seen by the electronic module 60. In the preferred embodiment, the diameter of the top shoulders 62, 64 of each of the pins 54, 56 is approximately 0.109 inch, and the centers of the pins 54, 56 are approximately 0.3 inch apart. In the embodiment shown, the resistance between the pins 54, 56 must be approximately 400 kilohms or less in order to active the music. Notably, although the distance between the pins 54, 56 may be varied, it should be sufficient so that an infant cannot easily short them with her or his fingers and, thus, hear a song without properly using the device 20.

The electronic module 60 includes two 1.5 volt, replaceable, button-cell batteries 70, 72, a sensing circuit 74, melody generator 76, and piezo-electric speaker 78. See FIGS. 5, 6, and 9. The batteries 70, 72, sensing circuit 74, and melody generator 76 are mounted on a circuit board 80. The circuit board 80 includes two electrically conductive surfaces, or contacts 82, 84, that are interconnected to the sensing circuit 74.

The buffer 58 is an elastomeric, "single direction" electrical conductor that couples the pin 54 with the contact 82 and the pin 56 with the contact 84. Such coupling of corresponding pins 54, 56 and contacts 82, 84 can be accomplished by simply positioning the buffer 58 between the pins 54, 56 and contacts 82, 84, as shown. The buffer 58 does not "short circuit" the pins 54, 56 and contacts 82, 84.

Figure 8:
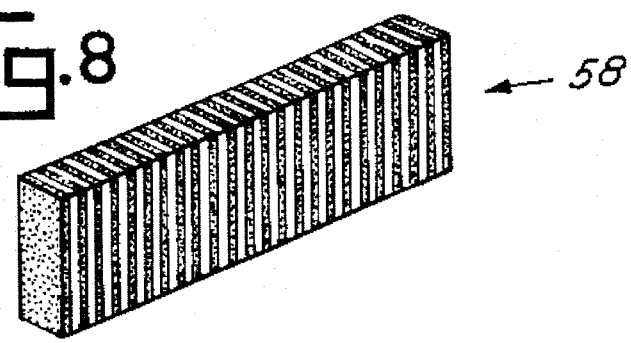
FIG. 8 is a isometric view of the electrically conductive, elastomeric buffer shown in FIG. 4.

The single elastomeric, "single directional" conductor has thin, alternating, parallel layers of conductive and non-conductive silicon rubber, as shown for example in FIG. 8 and 9. Thus, as the pins 54, 56 press against the elastomeric buffer 58, which presses against the contacts 82, 84 of the electronic module 60, the pins 54, 56 are electrically interconnected with the sensing circuit 74.

The housing 26 is positioned on, and partially formed by, the outer surface 36 of the shell 22, near the bottom, or center 32, of the bowl 28. The housing 26 includes a base 86, which encircles the electronic module 60, a snap-on cover 88, and a substantially water-tight, sealing gasket 90.

The housing base 86 is a quasi-elliptical double wall construction, with outer and inner walls 92, 94. The gasket 90 lies between the walls 92, 94. The cover 88 snaps in place by pressing against the outer wall 92 and depressing of the gasket 90.

The closing of the cover 88 serves several functions. The closing presses the electronic module's contacts 82, 84 against the buffer 58 and the pins 54, 56. As a result, the closing indirectly provides for electrical contact between the pins 54, 56 and contacts 82, 84, thus eliminating the need for soldering. Such soldering (which is unnecessary with the device 20 shown) is a costly operation in the assembly of many other electrical apparatus.

Further, when closed, the cover 88 presses against the piezo-electric speaker 88, holding it in place and in contact with the body of the shell 22 for maximum sound energy transfer. When in position, the cover 88 also compresses the gasket 90 between the walls 92, 94 of the housing 26, thus providing a barrier against moisture. As a result, the electronics module is substantially "waterproofed," which is valuable when the device 22 is used in the occasionally moist environment of a bathroom or when the device is washed.

Accordingly, by utilizing the elastomeric buffer 58 and cover 88, a manufacturer may reduce the number of components necessary to build the device 20, as well as reducing the need to solder electrical components. Further, such a combination allows the manufacture to utilize components having larger tolerances. The combination also provides increased reliability, since, without soldering, there is less stress and fatigue due to heat deformation of the soldered and supported parts. As a result, the cost of manufacturing the device is directly or indirectly reduced. This can ultimately reduce the price for consumers.

Of course, if the pins 54, 56 were to be made themselves of an elastomeric conductive material (rather than a rigid material), the use of the separate elastomeric buffer 58 may not be necessary. The pins 54, 56 themselves, in such a case, would abut the contacts 82, 84. The portions of the pins 54, 56 extending between the outer surface 36 and the contacts 82, 84 would function as, and should be considered the equivalent of, the elastomeric buffer 58.

Figure 10:
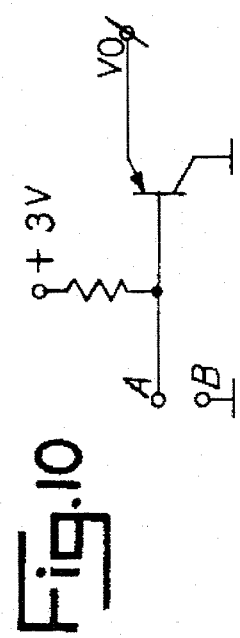
FIG. 10 is a schematic diagram of the sensing circuit shown in FIG. 9.

The sensing circuit 74 includes of a PNP transistor (2N4403) 96 and a 5.6 megohm pull up resistor 98, as shown in FIG. 10. When the resistance between the pins 54, 56 drops below, for example, 400 kilohms, the sensing circuit 74 provides an activation signal (low emitter voltage) to the melody generator 76.

The resistance measured by the sensing circuit 74 depends, in addition to the pin size and placement, on the composition of the elastomeric buffer 58, as well as on the length of time that urine in the bowl 28 is conducting the current. The resistance of the urine, as "seen" by the sensing circuit 74, often varies over time, and generally tends to go up.

The increase of resistance with time may be explained by the electrolysis process that takes place when electric current is passed through a solution with a high concentration of ions, as is the case with urine. A deposit of chemical products, such as salt, might also occur on the pins, thus reducing the actual conductivity between the urine and the pins 54, 56. A consequent reduction in current, however, may lead to a stabilization of the resistance detected by the sensing circuit 74.

By using a general purpose and relatively inexpensive PNP transistor 96 and the pull up resistor 98, a reasonably long-lasting logic low, or activation signal, is generated in the presence of excrement. Thus, a stable activation signal can be generated by the sensing circuit 74 to activate the melody generator 76 to produce a sound. A formula for the generated control voltage is shown below:

$$V_O = (260R_1\beta + 260R_1 + R_xR_1 v_{BATT} + 400\beta R_x v_{BATT} + 400R_x v_{BATT} + 260R_x\beta + 260R_x)/(400R_1\beta + 400R_1 + R_xR_1 + 400R_x\beta + 400R_x)$$

where $V_O$ is the output voltage of the transistor at the emitter, $R_1 = 5.6$ megohms, $\beta$ = transistor gain (DC), $R^x$ = the resistance between the contacts, and $V^{BATT}$ = the battery voltage.

Figure 11:
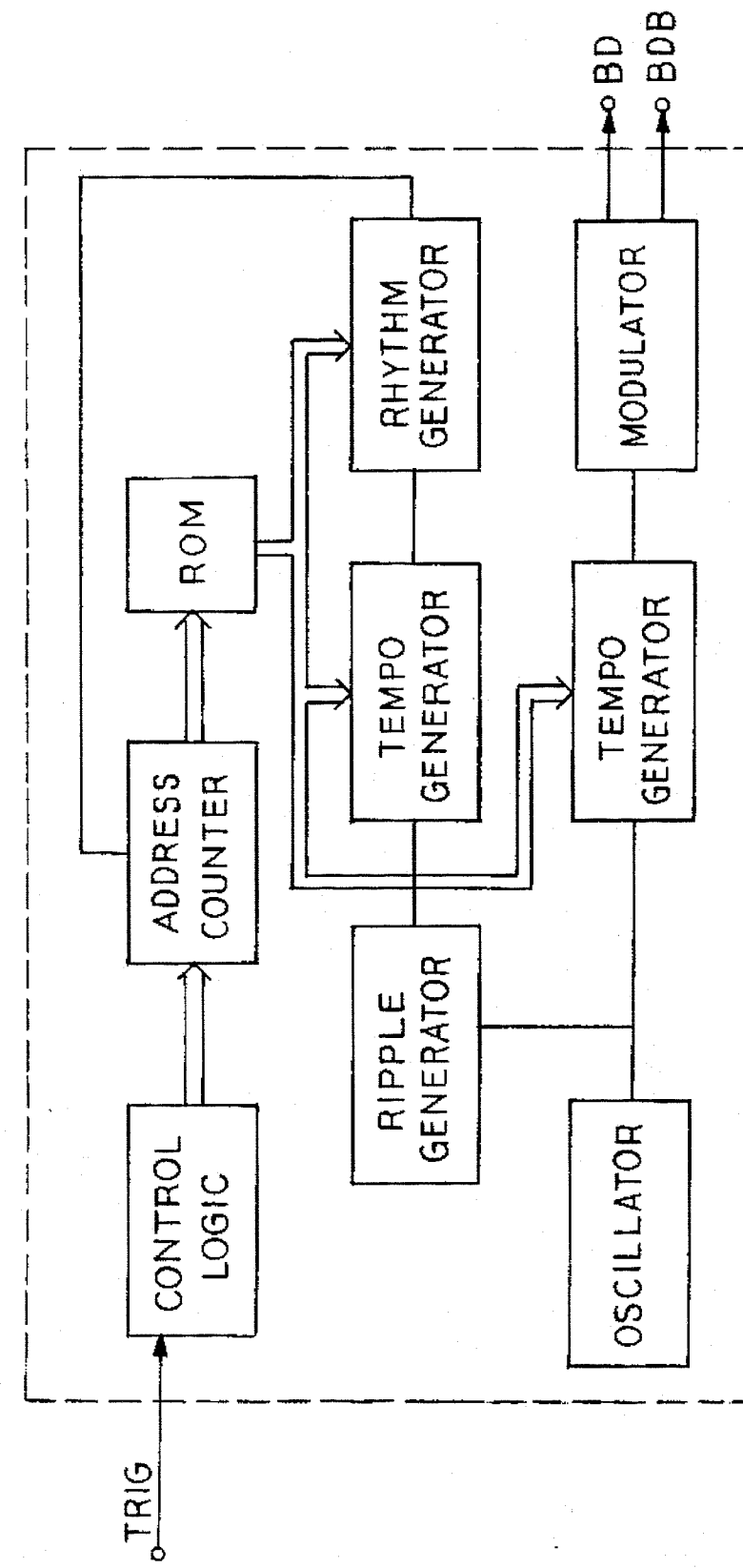
FIG. 11 is a block diagram of the melody generator shown in FIG. 9.

The melody generator 76 is a CMOS, large scale integrated circuit: an off-the-shelf model RTS948X. The outputs 100, 102 drive the piezo-electrical speaker 78. A block diagram of the melody generator 76 is shown in FIG. 11.

In operation, the lower resistance between the pins 54, 56 created by the moisture of the excrement in the center of the bowl 28 is detected by the sensing circuit 74. The sensing circuit 74 provides an activation signal to trigger the melody generator 76, which begins playing 1 of 16 different preprogrammed tunes. Thus, the device 20 provides substantially immediate, positive feedback to a child when the child uses the toilet, rewarding the child with a pleasant melody in the process of toilet training.

If the resistance between the pins 54, 56 is removed, such as if the bowl 28 is cleaned and wiped dry, then the current tune will finish and the melody generator 76 will revert to a standby mode. If the lowered resistance is continuously present, the generator 76 will continue to play different melodies.

With the embodiment shown in FIGS. 3 and 4, a relatively small amount of urine is sufficient to cover both contacts. Thus, the melody will start and continue to play until the excrement is removed. Some children may stop urinating immediately after the music starts and may have no incentive to finish urinating, since the music continues to play. If the bowl 28 is emptied by a parent, the child may urinate a few drops again and stop, without emptying her or his bladder. The start/stop actions of the child may prove to be a very positive and playful exercise in bladder control, but may, after a time, become a nuisance.

Figure 7:
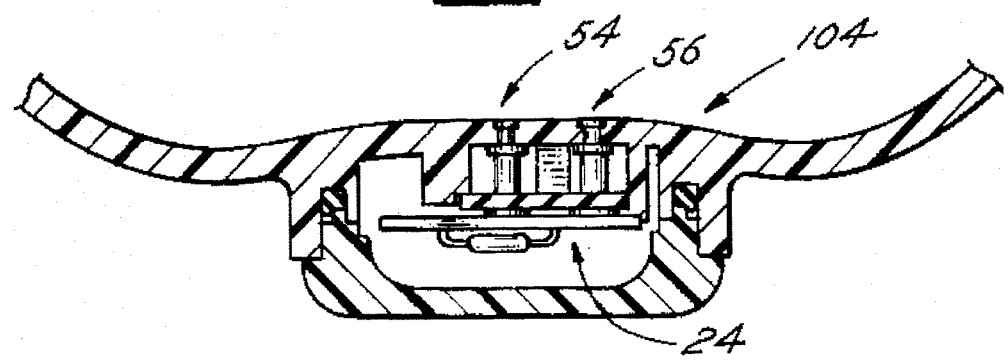
FIG. 7 is a cross-sectional view of an alternative embodiment of the bowl center shown in FIGS. 3 and 4.

Accordingly, in an alternative embodiment shown in FIG. 7, the bottom or center 32 of the bowl 28 may include a raised mound 104. With such a design, the music will not play continuously if the child only urinates a few drops. Rather, only after the excrement has accumulated to a level high enough to cover the pins 54, 56 on the raised mound 104 will the music continue to play. Nonetheless, with the embodiment shown in FIG. 7, music may play as long as urine spatters on the pins 54, 56, regardless of how much urine has accumulated around the raised mound 104 in the center 32 of the bowl 28.

Thus, when using the embodiment shown in FIG. 7, the pins 54, 56 will be covered temporarily as urine splatters on the pins, and, with every flow event, the music will play one melody. When, however, the bottom of the bowl 28 is filled sufficiently and the accumulated urine covers the two pins 54, 56, the melodies will continuously play until the bowl is emptied and wiped dry. The volume of the accumulated urine necessary to start the continuous play can be precisely controlled by the height of mound 104 above the center 32 of the bowl 28.

Preferred embodiments of the present invention have been described herein. It is to be understood, however, that changes and modification can be made without departing from the true scope and spirit of the present invention. This true scope and spirit are defined by the following claims, to be interpreted in light of the foregoing specification.

I claim:

1. A toilet training device comprising, in combination:

a bowl defining inner and outer surfaces;

at least two electrical pins extending between said inner and outer surfaces of said bowl, said pins defining a resistance between them;

at least two sensing contacts, each of said contacts corresponding to one of said pins;

at least one elastomeric buffer electrically coupling said pins and contacts;

a sensing circuit for detecting said resistance between said pins and responsively providing an activation signal;

a music generator, interconnected to said sensing circuit, for providing a sound in respons to said activation signal;

a housing base, substantially adjacent said outer surface of said container for substantially encircling said elastomeric buffer, sensing circuit, and music source;

a housing cover for removably attaching to said housing base and pressing said contacts and elastomeric buffer toward said pins; and a substantially water-tight seal between said housing base and cover.

* * * * *